United States Patent
Hamaoka et al.

(10) Patent No.: US 8,264,312 B2
(45) Date of Patent: Sep. 11, 2012

(54) LINEAR SOLENOID

(75) Inventors: Yasuhiro Hamaoka, Kariya (JP); Yoshiyuki Murao, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/084,798

(22) Filed: Apr. 12, 2011

(65) Prior Publication Data
US 2011/0248805 A1   Oct. 13, 2011

(30) Foreign Application Priority Data

Apr. 12, 2010   (JP) .................................. 2010-91189

(51) Int. Cl.
 *H01F 7/08* (2006.01)
 *H01F 3/00* (2006.01)
 *H01F 7/00* (2006.01)
(52) U.S. Cl. .................. 335/255; 335/278; 335/260
(58) Field of Classification Search .................. 335/260, 335/278, 255
See application file for complete search history.

(56) References Cited

U.S. PATENT DOCUMENTS

| | | | |
|---|---|---|---|
| 3,805,203 A * | 4/1974 | Deckard | 335/239 |
| 5,413,082 A * | 5/1995 | Cook et al. | 123/520 |
| 6,076,550 A * | 6/2000 | Hiraishi et al. | 137/550 |
| 6,722,627 B2 * | 4/2004 | Murao et al. | 251/129.15 |
| 7,044,111 B2 * | 5/2006 | Cook | 123/520 |
| 7,209,020 B2 * | 4/2007 | Telep | 335/255 |
| 7,481,412 B2 * | 1/2009 | Ishikawa et al. | 251/30.04 |
| 7,564,332 B2 * | 7/2009 | Telep | 335/255 |
| 2004/0257185 A1 | 12/2004 | Telep | |
| 2007/0046406 A1 * | 3/2007 | Matsuoka et al. | 335/202 |
| 2007/0152790 A1 * | 7/2007 | Telep | 335/255 |
| 2009/0039992 A1 * | 2/2009 | Ryuen et al. | 335/255 |
| 2009/0050829 A1 * | 2/2009 | Haynes et al. | 251/129.02 |

FOREIGN PATENT DOCUMENTS

| | | |
|---|---|---|
| JP | H10-241932 | 9/1998 |
| JP | P2008-98404 A | 4/2008 |
| JP | P2009-44924 A | 2/2009 |

OTHER PUBLICATIONS

Japanese Office Action dated Jan. 17, 2012, issued in corresponding Japanese Application No. 2010-091189 with English Translation.

* cited by examiner

*Primary Examiner* — Elvin G Enad
*Assistant Examiner* — Alexander Talpalatskiy
(74) *Attorney, Agent, or Firm* — Nixon & Vanderhye PC

(57) ABSTRACT

A linear solenoid includes a shaft to reciprocate in an axis direction, a movable member fixed to the shaft, a front stator, a rear stator, a coil, a front housing, and a rear housing. The front housing is made of metal, and covers the front stator and the coil in the axis direction. The rear housing is made of metal, and is connected to the front housing so as to define a space to accommodate the movable member, the front stator, the rear stator and the coil. The rear housing covers the rear stator and the coil in the axis direction.

15 Claims, 3 Drawing Sheets

LINEAR SOLENOID

CROSS REFERENCE TO RELATED APPLICATION

This application is based on Japanese Patent Application No. 2010-91189 filed on Apr. 12, 2010, the disclosure of which is incorporated herein by reference in its entirety.

BACKGROUND OF THE INVENTION

1. Field of the Invention

The present invention relates to a linear solenoid.

2. Description of Related Art

JP-A-2005-45217 describes a linear solenoid that drives a switch valve to switch an oil passage. The linear solenoid has a shaft to press and drive a spool of the switch valve in an axis direction. As shown in FIG. 13 of JP-A-2005-45217, an end portion of the shaft opposite from the spool is slidably supported by an inner wall of a cylindrical part of a rear stator, and the shaft has reciprocation movement together with a movable member. The cylindrical part has an opening opposite from the movable member, and the opening opens to outside of the linear solenoid. In this case, the rear stator is easily produced by pressing operation. However, if operating oil flows from the switch valve, the oil may leak out of the linear solenoid through the opening of the cylindrical part. Therefore, a location of the linear solenoid is limited to inside of an engine when the linear solenoid is used for driving a switch valve of a valve timing controlling device.

As shown in FIG. 2 of JP-A-2005-45217, an end face of a linear solenoid adjacent to a rear stator is molded with resin. In this case, the linear solenoid can be arranged outside of an engine, because operating oil never flows out of the linear solenoid, due to the molded resin. The rear stator has a based double cylinder shape. Therefore, resin can be prevented from flowing into the linear solenoid when the end face of the linear solenoid is molded with resin. However, the rear stator having the based double cylinder shape is difficult to produce by pressing operation. For example, cutting and shaving process is necessary for producing the rear stator. In this case, producing cost of the linear solenoid is increased.

SUMMARY OF THE INVENTION

In view of the foregoing and other problems, it is an object of the present invention to provide a linear solenoid.

According to an example of the present invention, a linear solenoid includes a shaft, a movable member, a front stator, a rear stator, a coil, a front housing, and a rear housing. The movable member is fixed on a middle of the shaft in an axis direction. The front stator has a first hole to support a front end portion of the shaft to reciprocate in the axis direction. The rear stator has a second hole to support a rear end portion of the shaft to reciprocate in the axis direction. The coil has an approximately cylindrical shape, and is located outside of the front stator and the rear stator in a radial direction. The coil generates magnetic force by being supplied with electricity so as to attract the movable member and the shaft toward the front stator. The front housing is made of metal, and has a hole to support the front end portion of the shaft. The front housing covers front side of the front stator and the coil in the axis direction. The rear housing is made of metal, and has an outer periphery connected to an outer periphery of the front housing so as to define a space to accommodate the movable member, the front stator, the rear stator and the coil. The rear housing covers rear side of the rear stator and the coil in the axis direction.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

Figure 1:
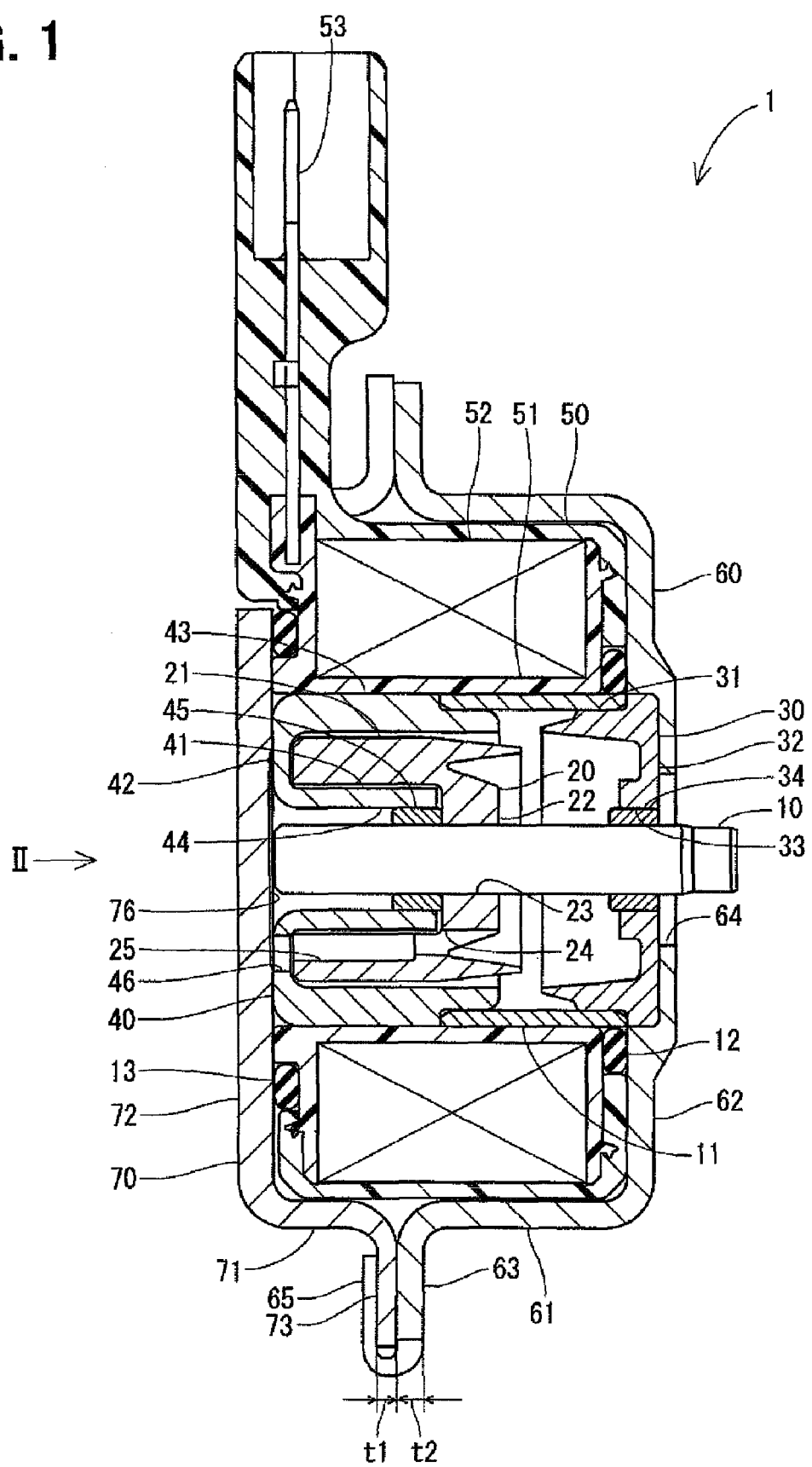
FIG. 1 is a cross-sectional view illustrating a linear solenoid according to an embodiment of the present invention.

A linear solenoid 1 drives a switch valve (not shown) to switch an oil passage of a valve timing controlling device (not shown), for example. As shown in FIG. 1, the linear solenoid 1 has a shaft 10, a movable member 20, a front stator 30, a rear stator 40, a coil 50, a front housing 60, a rear housing 70, and a seal member 13, for example. Right side of FIG. 1 is defined as front, and left side of FIG. 1 is defined as rear. However, spatially relative terms such as front and rear are used for ease of description, so as not to be limited in a real situation.

The shaft 10 is made of metal, and has a bar shape, for example. The movable member 20 is made of magnetic material such as iron. The movable member 20 has a cylindrical part 21 and a bottom 22 which plugs a front end of the cylindrical part 21. A through hole 23 is defined at an approximately center part of the bottom 22. The shaft 10 is fitted into the through hole 23, so that the movable member 20 is fixed to the shaft 10 at a middle position in an axis direction.

The front stator 30 is made of magnetic material such as iron. The front stator 30 has a cylindrical part 31 and a bottom 32 which plugs a front end of the cylindrical part 31. A through hole 33 is defined at an approximately center part of the bottom 32. A ring member 34 is fitted into the hole 33.

The ring member 34 is made of metal, for example. A front end portion of the shaft 10 passes through the ring member 34, and the shaft 10 is slidable in the axis direction, so that the ring member 34 slidably supports the front end portion of the shaft 10. That is, the hole 33 of the front stator 30 supports the front end portion of the shaft 10 through the ring member 34, and the shaft 10 can have reciprocation movement in the axis direction. The hole 33 may correspond to a first hole. Other material may be applied to an inner wall of the ring member 34 so as to reduce friction with other component. Thereby, the shaft 10 can have smooth reciprocation movement on an inner side of the ring member 34.

The rear stator 40 is made of magnetic material such as iron, and has an approximately double cylinder shape. Specifically, the rear stator 40 has a first cylindrical part 41, a bottom 42, and a second cylindrical part 43. The bottom 42 extends from a rear end of the first cylindrical part 41 outward in a radial direction, and has an annular shape. The second cylindrical part 43 extends from outer circumference of the bottom 42 in the same direction as the first cylindrical part 41. A hole 44 is defined by an inner wall of the first cylindrical part 41. A ring member 45 is fitted into the hole 44 from an end opposite from the bottom 42.

The ring member 45 is made of metal, for example, similar to the ring member 34. A rear end portion of the shaft 10 passes through the ring member 45, and the shaft 10 is slidable in the axis direction, so that the ring member 45 slidably supports the rear end portion of the shaft 10. That is, the hole 44 of the rear stator 40 supports the rear end portion of the shaft 10 through the ring member 45, and the shaft 10 can have reciprocation movement in the axis direction. The hole 44 may correspond to a second hole. The rear stator 40 is produced by a press working, for example. Other material may be applied to an inner wall of the ring member 45 so as to reduce friction with other component. Thereby, the shaft 10 can have smooth reciprocation movement on an inner side of the ring member 45.

A cylindrical member 11 is fitted onto outer circumference of the front stator 30 opposite from the bottom 32 and outer circumference of the rear stator 40 opposite from the bottom 42. The front stator 30 and the rear stator 40 are connected with each other through the cylindrical member 11. In this state, the movable member 20 is located between the front stator 30 and the rear stator 40. A thickness of the cylindrical part 21 of the movable member 20 is set smaller than a distance between the first cylindrical part 41 and the second cylindrical part 43 in the radial direction. Therefore, the cylindrical part 21 of the movable member 20 can have reciprocation movement in the axis direction in a range between the first cylindrical part 41 and the second cylindrical part 43. The shaft 10 can reciprocate in the axis direction together with the movable member 20. The cylindrical member 11 is made of a non-magnetic material.

The coil 50 is located outside of the front stator 30, the cylindrical member 11 and the rear stator 40 in the radial direction. The coil 50 has a bobbin 51 and a winding wire 52. The bobbin 51 is made of resin, and has an approximately cylindrical shape. The front stator 30, the cylindrical member 11, and the rear stator 40 are located inside of the bobbin 51 in the radial direction. The winding wire 52 is made of copper, and is wound around the bobbin 51. An end of the winding wire 52 is connected to a terminal 53. If current flows through the winding wire 52 via the terminal 53, magnetic force is generated in the coil 50. Periphery side of the bobbin 51 and the winding wire 52 is molded by resin.

The front housing 60 has an approximately cup shape, and is made of magnetic material such as iron. The front housing 60 has a cylindrical part 61, a bottom 62 which plugs a front end of the cylindrical part 61, and an annular outer periphery 63 extending from a rear end of the cylindrical part 61 outward in the radial direction. The bottom 62 has a hole 64, and a diameter of the hole 64 is larger than an outer diameter of the shaft 10. The coil 50, the front stator 30, the cylindrical member 11, the rear stator 40, the shaft 10, and the movable member 20 are located inside of the cylindrical part 61 of the front housing 60. That is, the front housing 60 is arranged to cover front side of the front stator 30 and the coil 50 in the axis direction. The front end portion of the shaft 10 passes through the hole 64. The front stator 30 is contact with the bottom 62 of the front housing 60.

An annular seal member 12 is arranged between the bobbin 51 of the coil 50 and the bottom 62 of the front housing 60 in the axis direction. The front stator 30 and the cylindrical member 11 are located on inner side of the seal member 12 in the radial direction. The seal member 12 is made of elastic material, and liquid-tightly seals a clearance between the bottom 62 and the bobbin 51. The seal member 12 may be an O-ring made of rubber, or a liquefied gasket. An inner diameter of the cylindrical part 61 is approximately equal to an outer diameter of the coil 50, so that the coil 50 is stably positioned inside of the front housing 60.

The rear housing 70 has an approximately cup shape, and is made of magnetic material such as iron, similar to the front housing 60. The rear housing 70 has a cylindrical part 71, a bottom 72 which plugs an rear end of the cylindrical part 71, and an annular outer periphery 73 extending from a front end of the cylindrical part 71 outward in the radial direction. The coil 50 and the rear stator 40 are located inside of the cylindrical part 71 of the rear housing 70. That is, the rear housing 70 is arranged to cover rear side of the rear stator 40 and the coil 50 in the axis direction. The outer periphery 73 of the rear housing 70 is connected to the outer periphery 63 of the front housing 60. Thus, the movable member 20, the front stator 30, the rear stator 40, and the coil 50 are accommodated between the front housing 60 and the rear housing 70. The bottom 72 of the rear housing 70 is arranged to contact the bottom 42 of the rear stator 40.

The seal member 13 has an annular shape, and is located between the bobbin 51 of the coil and the bottom 72 of the rear housing 70 in the axis direction. The rear stator 40 is located inside of the seal member 13 in the radial direction. The seal member 13 is made of elastic material, and liquid-tightly seals a clearance between the bottom 72 and the bobbin 51. The seal member 13 may be an O-ring made of rubber, or a liquefied gasket, similar to the seal member 12. An inner diameter of the cylindrical part 71 is approximately equal to or slightly larger than the outer diameter of the coil 50.

Figure 2:
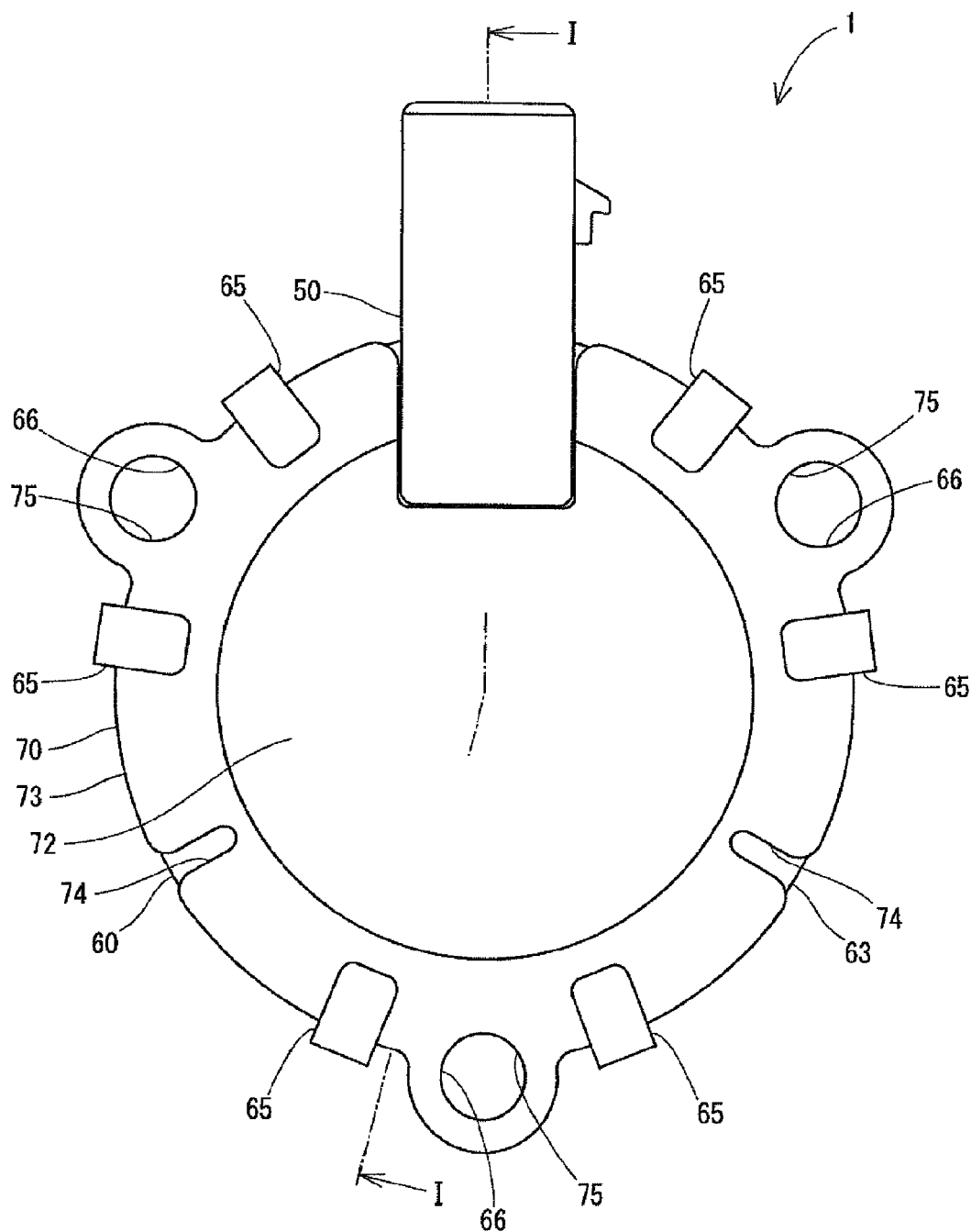
FIG. 2 is a side view illustrating the linear solenoid seen from an arrow direction II of FIG. 1.

For example, the outer periphery 63 of the front housing 60 and the outer periphery 73 of the rear housing 70 are combined with each other by swaging. Specifically, as shown in FIGS. 1 and 2, the outer periphery 63 of the front housing 60 has plural nails 65 projected outward in the radial direction. The outer periphery 63 of the front housing 60 is swaged to the outer periphery 73 of the rear housing 70 by bending the nails 65 toward the rear housing 70. For example, as shown in FIG. 2, the outer periphery 63 has six of the nails 65 in a circumference direction. The nail 65 may correspond to a first nail.

As shown in FIG. 1, the outer periphery 73 of the rear housing 70 has a thickness t1 that is smaller than a thickness t2 of the outer periphery 63 of the front housing 60. Therefore, strength of the outer periphery 73 is lower than that of the outer periphery 63. As shown in FIG. 2, the outer periphery 73 of the rear housing 70 has plural slits 74 recessed inward in the radial direction, so that the strength of the outer periphery 73 of the rear housing 70 is lowered. Thus, the outer periphery 73 of the rear housing 70 is easily deformed when the nails 65 of the front housing 60 are bent for the swaging, so that the outer periphery 73 tightly contacts the outer periphery 63.

Before the swaging, the rear housing 70 and the front housing 60 have a predetermined clearance between the outer periphery 73 and the outer periphery 63. In contrast, after the swaging, axial force is applied to the front stator 30, the rear stator 40, and the coil 50 from the rear housing 70 and the front housing 60.

As shown in FIG. 2, plural attachment holes 75 are defined on the outer periphery 73 of the rear housing 70 in the circumference direction. Plural attachment holes 66 are defined on the outer periphery 63 of the front housing 60, and correspond to the attachment holes 75, respectively. For example, the rear housing 70 has three of the attachment holes 75, and the front housing 60 has three of the attachment holes 66. When the linear solenoid 1 is attached to an engine cover, for example, by a connection member such as a bolt, the connection member passes through the attachment holes 75 and the attachment holes 66. At this time, the axial force applied to the front stator 30, the rear stator 40, and the coil 50 from the rear housing 70 and the front housing 60 is further increased by the connection member. Further, the outer periphery 73 of the rear housing 70 and the outer periphery 63 of the front housing 60 become more tightly contact with each other. If the linear solenoid 1 is mounted to the engine cover, the front housing 60 may be located on the engine cover, and the rear housing 70 may be exposed from the engine cover.

The bottom 22 of the movable member 20 has a through hole 24, and a slot 25 is defined in the inner wall of the cylindrical part 21 of the movable member 20. The slot 25 is connected to the hole 24. The bottom 42 of the rear stator 40 has a through hole 46. Further, a face of the bottom 72 opposing to the rear stator 40 has a recess 76 recessed in a direction opposite from the rear stator 40. A first space between the bottom 22 of the movable member 20 and the front stator 30 communicates with a second space inside of the first cylindrical part 41 of the rear stator 40 through the hole 24, the slot 25, the hole 46, and the recess 76. Therefore, while the movable member 20 is reciprocated between the front stator 30 and the rear stator 40 together with the shaft 10, a pressure difference can be reduced between the first space and the second space. Thus, the movable member 20 can have smooth reciprocation movement between the front stator 30 and the rear stator 40 together with the shaft 10.

Operation of the linear solenoid 1 will be described. The linear solenoid 1 drives a switch valve (not shown) of a valve timing controlling device, for example. The switch valve has a cylindrical sleeve having plural holes, and a spool reciprocatably located inside of the sleeve. Each hole is connected to each oil passage, and the oil passage is switched when the spool is reciprocated in the sleeve. The linear solenoid 1 causes the reciprocation of the spool. That is, due to the linear solenoid 1, the spool is driven to move in the axis direction.

The linear solenoid 1 is arranged in a manner that a front end of the shaft 10 contacts a rear end of the spool. A biasing portion is arranged between a front end of the spool and the sleeve, so that the spool is biased toward the shaft 10 by the biasing portion. As a result, as shown in FIG. 1, when the linear solenoid 1 is not activated, that is when electric power is not supplied to the linear solenoid 1, the shaft 10 and the movable member 20 are biased toward the rear housing 70. At this time, the bottom 22 of the movable member 20 contacts the first cylindrical part 41 of the rear stator 40 or the ring member 45, and/or the rear end of the shaft 10 contacts the bottom 72 of the rear housing 70.

When electric power is supplied to the linear solenoid 1, current flows through the winding wire 52 of the coil 50, so that magnetic force is generated in the coil 50. Flux of magnetic induction flows through the front stator 30, the front housing 60, the rear housing 70, and the rear stator 40. The nonmagnetic cylindrical member 11 located between the rear stator 40 and the front stator 30 prevents magnetic short circuit between the rear stator 40 and the front stator 30. Therefore, the flux of magnetic induction flows between the rear stator 40 and the front stator 30 via the movable member 20 by avoiding the cylindrical member 11. That is, a magnetic circuit is defined in the front stator 30, the front housing 60, the rear housing 70, the rear stator 40, and the movable member 20 when the magnetic force is generated in the coil 50. The movable member 20 is attracted toward the front stator 30 together with the shaft 10 against the biasing force of the biasing portion. As a result, the position of the spool is changed in the axis direction, so that the oil passage is switched.

Duty-ratio of electric power supplied to the linear solenoid 1 is controlled by an electronic control unit (ECU) which is not illustrated, so that a power of attracting the movable member 20 can be adjusted suitably. As a result, the position of the spool can be controlled in the axis direction arbitrarily, so that the oil passage can be switched appropriately.

Figure 3:
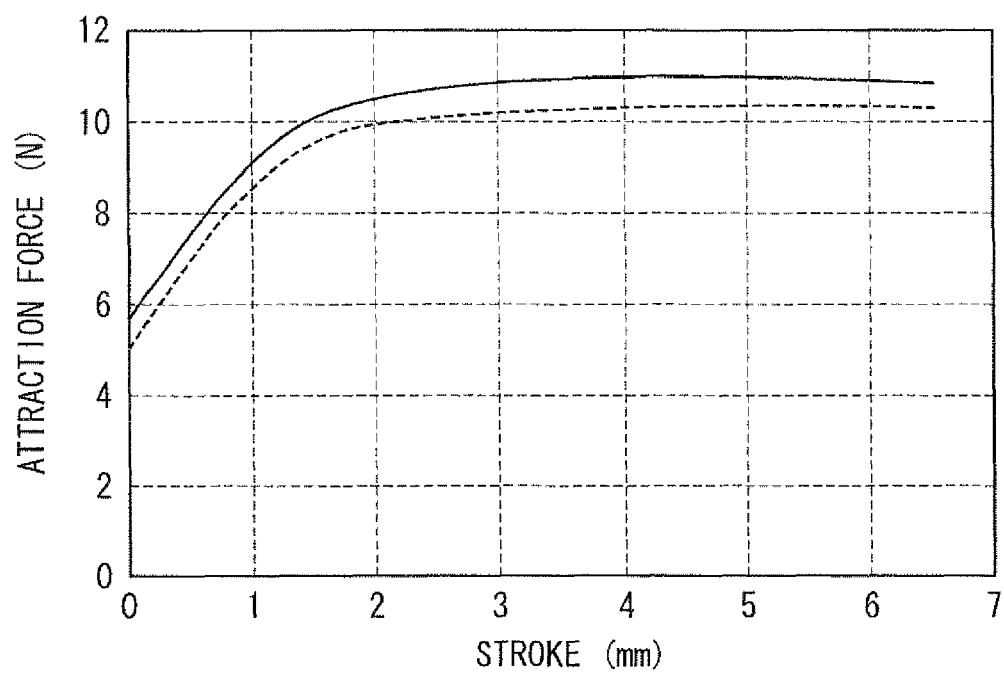
FIG. 3 is a graph illustrating a relationship between a stroke of a shaft of the linear solenoid and an attraction force of the linear solenoid.

The attraction force of the linear solenoid 1 will be described by referring to a comparison example. In the comparison example, a linear solenoid has a predetermined clearance between a bottom of a rear housing and a bottom of a rear stator. FIG. 3 shows a relationship between a stroke of the shaft 10 and the attraction force of the linear solenoid 1. Further, a difference between the comparison example and the present embodiment is shown in FIG. 3. A broken line expresses characteristics of the comparison example, and a continuous line expresses characteristics of the embodiment. As shown in FIG. 3, the attraction force of the embodiment is larger than that of comparison example. The bottom 72 of the rear housing 70 and the bottom 42 of the rear stator 40 are tightly contact with each other, according to the present embodiment. Therefore, the attraction force can be increased compared with the comparison example having the clearance between the rear housing and the rear stator.

According to the embodiment, the rear stator 40 is constructed by the cylindrical parts 41, 43 and the bottom 42. The first cylindrical part 41 has the inner wall defining the hole 44. The annular bottom 42 extends from the rear end of the first cylindrical part 41 outward in the radial direction. The second cylindrical part 43 extends from the outer circumference of the bottom 42 in the same direction as the first cylindrical part 41. If the rear stator 40 is molded with resin, for example, resin permeation may be generated via the inner side of the first cylindrical part 41. In contrast, according to the embodiment, the rear stator 40 is not molded with resin, but is covered with the metal housing 70. Therefore, there is no fear of the resin permeation, in the present embodiment.

It is unnecessary to plug the opening of the second hole 44 because the rear stator 40 is covered by the rear housing 70. That is, the second hole 44 can pass through the rear stator 40. Specifically, the cylindrical part 41 of the rear stator 40 has the inner wall defining the second hole 44, and both ends of the second hole 44 are not plugged.

Moreover, the rear stator 40 can be easily produced by press working, because the shape of the rear stator 40 is comparatively simple. Therefore, processing cost of the rear stator 40 can be reduced, so that manufacturing cost of the linear solenoid 1 can be reduced.

The rear housing 70 seals a rear opening of the hole 44 opposite from the front stator 30, and a rear end of the coil 50. Further, the annular seal member 13 is arranged between the coil 50 and the rear housing 70 so that the rear stator 40 is located inside of the seal member 13 in the radial direction. In the present embodiment, the linear solenoid 1 is used for driving the switch valve of the valve timing controlling device. Therefore, if operating oil flows from the switch valve, the oil can be restricted from leaking outside of the linear solenoid 1 via the hole 44 and a clearance between the rear stator 40 and the coil 50. Thus, the operating oil is prevented from leaking outward via the inside of the linear solenoid 1. Accordingly, the location of the linear solenoid 1 can be flexibly changed. For example, the linear solenoid 1 can be arranged outside of an engine.

The rear housing 70 is arranged to contact the rear stator 40. Therefore, when the rear housing 70 defines the magnetic circuit with the front housing 60, the front stator 30, and the rear stator 40, the power of attracting the movable member 20 can be much increased.

The outer periphery 63 of the front housing 60 has the nails 65 projected outward in the radial direction. The front housing 60 is swaged to the outer periphery 73 of the rear housing 70 by bending the nails 65 toward the rear housing 70. The housings 70, 60 can be easily connected to each other by the swaging.

The thickness t1 of the outer periphery 73 to have the swaging is smaller than the thickness t2 of the outer periphery 63 of the front housing 60. Therefore, the outer periphery 73 of the rear housing 70 has low strength compared with the outer periphery 63 of the front housing 60, so that the outer periphery 73 is easily deformed. Thus, the outer periphery 73 tightly contacts the outer periphery 63 of the front housing 60, by the swaging. Further, contact area between the outer periphery 73 of the rear housing 70 and the outer periphery 63 of the front housing 60 can be increased. As a result, the magnetic circuit formed by the rear housing 70 and front housing 60 can be made stable.

The outer periphery 73 of the rear housing 70 has the slits 74 recessed inward in the radial direction. Therefore, the outer periphery 73 of the rear housing 70 has low strength, so that the outer periphery 73 is easily deformed. Thus, the outer periphery 73 tightly contacts the outer periphery 63 of the front housing 60, by the swaging. Further, contact area between the outer periphery 73 of the rear housing 70 and the outer periphery 63 of the front housing 60 can be increased. As a result, the magnetic circuit formed by the rear housing 70 and front housing 60 can be made stable.

Before the swaging, the rear housing 70 and the front housing 60 have the predetermined clearance between the outer periphery 73 and the outer periphery 63. In contrast, after the swaging, the axial force is applied to the front stator 30, the rear stator 40, and the coil part 50 from the rear housing 70 and the front housing 60. When the front stator 30, the rear stator 40, and the coil part 50 are accommodated between the rear housing 70 and the front housing 60, the axial force is applied to the front stator 30, the rear stator 40, and the coil part 50. The positions of the stators 30, 40 and the coil 50 are stabilized between the rear housing 70 and the front housing 60. As a result, the magnetic circuit formed by the linear solenoid 1 can be made stable. Moreover, the rear housing 70 is securely made to contact the rear stator 40. Therefore, the power of attracting the movable member 20 can be further increased.

The outer periphery 63 of the front housing 60 has the first nails 65 in the above description. The outer periphery 73 of the rear housing 70 may have second nails projected outward in the radial direction. The outer periphery 73 of the rear housing 70 is swaged to the outer periphery 63 of the front housing 60 by bending the second nails toward the front housing 60. In this case, a thickness of the outer periphery 63 to have the swaging may be set smaller than that of the outer periphery 73. Further, the outer periphery 63 of the front housing 60 may have slits recessed inward in the radial direction.

The thickness of the outer periphery 63 of the front housing 60 may be set approximately equal to that of the outer periphery 73 of the rear housing 70. The slits of the outer periphery 73 of the rear housing 70 may be eliminated. The outer periphery 63 of the front housing 60 may be connected to the outer periphery 73 of the rear housing 70 by using a press fitting.

The rear stator 40 may have an approximately disc shape, and the second hole 44 to reciprocatably support the shaft 10 may be defined at a center of the disc shape. In this case, the rear stator can be easily produced by a pressing operation, for example. The movable member 20 is not limited to have the based cylinder shape. Alternatively, the movable member 20 may have disc or column shape.

The seal member 13 located between the coil 50 and the rear housing 70 may be eliminated. The seal member 12 located between the coil 50 and the front housing 60 may be eliminated.

The first hole 33 of the front stator 30 may directly support the shaft 10 without the ring member 34. The second hole 44 of the rear stator 40 may directly support the shaft 10 without the ring member 45.

The rear housing 70 may not contact the rear stator 40. The rear housing 70 and the rear stator 40 can form a part of the magnetic circuit even if the rear housing 70 does not contact the rear stator 40.

The outer periphery 73 of the rear housing 70 and the outer periphery 63 of the front housing 60 may contact with each other before the swaging.

The linear solenoid 1 can be suitably arranged inside or outside of the engine, because operation oil is prevented from leaking from the switch valve through the linear solenoid 1.

The linear solenoid 1 is not limited to be used for driving the switch valve.

Such changes and modifications are to be understood as being within the scope of the present invention as defined by the appended claims.

What is claimed is:

1. A linear solenoid comprising:
   a shaft;
   a movable member fixed on a middle of the shaft in an axis direction;
   a front stator having a first hole to support a front end portion of the shaft to reciprocate in the axis direction;
   a rear stator having a second hole to support a rear end portion of the shaft to reciprocate in the axis direction;
   a coil having an approximately cylindrical shape, the coil being located outside of the front stator and the rear stator in a radial direction, the coil generating magnetic force by being supplied with electricity so as to attract the movable member and the shaft toward the front stator;
   a front housing made of metal, the front housing having a hole in which the front end portion of the shaft passes, the front housing covering front side of the front stator and the coil in the axis direction; and
   a rear housing made of metal, the rear housing having an outer periphery connected to an outer periphery of the front housing so as to define a space to accommodate the movable member, the front stator, the rear stator and the coil, the rear housing covering rear side of the rear stator and the coil in the axis direction, wherein
   an outer periphery of the front housing has first nails projected outward in the radial direction, and
   the front housing is swaged to an outer periphery of the rear housing by bending the first nails toward the rear housing.

2. The linear solenoid according to claim 1, wherein
the rear stator has an approximately double cylinder shape defined by
   a first cylindrical part having an inner wall to define the second hole,
   an annular bottom extending outward in the radial direction from an end of the first cylindrical part opposite from the front stator, and
   a second cylindrical part extending from an outer circumference of the bottom in the same direction as the first cylindrical part.

3. The linear solenoid according to claim 1, wherein
the rear housing is arranged to contact the rear stator.

4. The linear solenoid according to claim 1, wherein the outer periphery of the rear housing to have the swaging has a thickness smaller than that of the outer periphery of the front housing.

5. The linear solenoid according to claim 1, wherein the outer periphery of the rear housing has slits recessed inward in the radial direction.

6. The linear solenoid according to claim 1, wherein an outer periphery of the rear housing has second nails projected outward in the radial direction, and the rear housing is swaged to an outer periphery of the front housing by bending the second nails toward the front housing.

7. The linear solenoid according to claim 6, wherein the outer periphery of the front housing to have the swaging has a thickness smaller than that of the outer periphery of the rear housing.

8. The linear solenoid according to claim 6, wherein the outer periphery of the front housing has slits recessed inward in the radial direction.

9. The linear solenoid according to claim 1, wherein the rear housing and the front housing have a predetermined clearance between the outer periphery of the rear housing and the outer periphery of the front housing before the swaging.

10. The linear solenoid according to claim 1, further comprising:
an annular seal member located between the coil and the rear housing in the axis direction, wherein
the rear stator is located inside of the seal member in the radial direction.

11. The linear solenoid according to claim 1, further comprising:
a cylindrical member arranged between the front stator and the rear stator, wherein
the front stator, the cylindrical member, and the rear stator are sandwiched between the front housing and the rear housing.

12. A linear solenoid comprising:
a shaft;
a movable member fixed on a middle of the shaft in an axis direction;
a front stator having a first hole to support a front end portion of the shaft to reciprocate in the axis direction;
a rear stator having a second hole to support a rear end portion of the shaft to reciprocate in the axis direction;
a coil having an approximately cylindrical shape, the coil being located outside of the front stator and the rear stator in a radial direction, the coil generating magnetic force by being supplied with electricity so as to attract the movable member and the shaft toward the front stator;
a front housing made of metal, the front housing having a hole in which the front end portion of the shaft passes, the front housing covering front side of the front stator and the coil in the axis direction; and
a rear housing made of metal, the rear housing having an outer periphery connected to an outer periphery of the front housing so as to define a space to accommodate the movable member, the front stator, the rear stator and the coil, the rear housing covering rear side of the rear stator and the coil in the axis direction, wherein
an outer periphery of the rear housing has second nails projected outward in the radial direction, and
the rear housing is swaged to an outer periphery of the front housing by bending the second nails toward the front housing.

13. The linear solenoid according to claim 12, wherein the outer periphery of the front housing to have the swaging has a thickness smaller than that of the outer periphery of the rear housing.

14. The linear solenoid according to claim 12, wherein the outer periphery of the front housing has slits recessed inward in the radial direction.

15. The linear solenoid according to claim 12, further comprising:
a cylindrical member arranged between the front stator and the rear stator, wherein
the front stator, the cylindrical member, and the rear stator are sandwiched between the front housing and the rear housing.

* * * * *